United States Patent
Kershaw et al.

(10) Patent No.: US 10,565,244 B2
(45) Date of Patent: *Feb. 18, 2020

(54) SYSTEM AND METHOD FOR TEXT CATEGORIZATION AND SENTIMENT ANALYSIS

(71) Applicant: NewVoiceMedia Ltd., Basingstoke, Hampshire (GB)

(72) Inventors: Jonathan Kershaw, Penrith (GB); Ashley Unitt, Basingstoke (GB); Alan McCord, Jacks Point (NZ)

(73) Assignee: NEWVOICEMEDIA LTD., Hampshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,447

(22) Filed: Feb. 22, 2019

(65) Prior Publication Data

US 2019/0171660 A1 Jun. 6, 2019

Related U.S. Application Data

(63) Continuation-in-part of application No. 16/163,482, filed on Oct. 17, 2018, now Pat. No. 10,311,454, which is a continuation-in-part of application No. 15/675,420, filed on Aug. 11, 2017, now Pat. No. 10,162,844.

(60) Provisional application No. 62/523,733, filed on Jun. 22, 2017.

(51) Int. Cl.
*G06F 7/00* (2006.01)
*G06F 17/30* (2006.01)
*G06F 16/35* (2019.01)
*G06F 16/34* (2019.01)

(52) U.S. Cl.
CPC ............ *G06F 16/353* (2019.01); *G06F 16/34* (2019.01)

(58) Field of Classification Search
CPC ....... G06F 16/353; G06F 16/34; G06F 16/243
USPC ................................ 707/736, 737, 738, 740
See application file for complete search history.

(56) References Cited

U.S. PATENT DOCUMENTS

| | | | |
|---|---|---|---|
| 7,788,086 B2 | 8/2010 | Corston-Oliver et al. | |
| 8,356,025 B2 | 1/2013 | Cai et al. | |
| 8,682,649 B2 | 3/2014 | Bellegarda | |
| 2008/0005051 A1* | 1/2008 | Turner | G06F 17/2735 706/20 |
| 2014/0188459 A1* | 7/2014 | Fink | G06F 17/2785 704/9 |
| 2016/0034571 A1* | 2/2016 | Setayesh | G06F 16/353 707/738 |
| 2017/0249389 A1* | 8/2017 | Brovinsky | G06Q 30/02 |

* cited by examiner

*Primary Examiner* — Md I Uddin
(74) *Attorney, Agent, or Firm* — Brian R. Galvin; Brian S. Boon; Galvin Patent Law LLC

(57) ABSTRACT

A system and method for improved categorization and sentiment analysis which is fed textual data such as transcriptions or collated data from a network enabled service, or some other source, which then segments textual data into chunks, parses the data chunks, and analyzes it using a plurality of techniques and metadata gathering methods to determine the sentiment of participating individuals concerning entities mentioned in the textual data and to categorize the discussions, for the purpose of taking actions to improve business outcomes.

2 Claims, 13 Drawing Sheets

SYSTEM AND METHOD FOR TEXT CATEGORIZATION AND SENTIMENT ANALYSIS

CROSS-REFERENCE TO RELATED APPLICATIONS

This application is a continuation-in-part of U.S. provisional patent application Ser. No. 16/163,482, titled "CUSTOMER INTERACTION AND EXPERIENCE SYSTEM USING EMOTIONAL-SEMANTIC COMPUTING" and filed on Oct. 17, 2018, which is a continuation-in-part of U.S. provisional patent application Ser. No. 15/675,420, titled "SYSTEM AND METHODS FOR USING CONVERSATIONAL SIMILARITY FOR DIMENSION REDUCTION IN DEEP ANALYTICS" and filed on Aug. 11, 2017, now issued as U.S. Pat. No. 10,162,844 on Dec. 25, 2018, which claims the benefit of, and priority to, U.S. provisional patent application Ser. No. 62/523,733, titled "SYSTEM AND METHODS FOR USING CONVERSATIONAL SIMILARITY FOR DIMENSION REDUCTION IN DEEP ANALYTICS" and filed on Jun. 22, 2017, the specifications of each of which are incorporated herein by reference in their entirety.

BACKGROUND OF THE INVENTION

Field of the Art

The disclosure relates to the field of information processing, and more particularly to the field of analyzing provided text representing conversations to analyze them for sentiments and performing categorizations that make a response to expressed sentiment actionable.

Discussion of the State of the Art

It is currently commonplace in textual analysis, to use regular expressions with dictionaries of words and databases of common or anticipated nouns, to perform simple lookups and pattern-matches to loosely categorize subject matter and sentiment during a conversation or from a text sample provided to a given system. This may be done to analyze the sentiments of people communicating on message boards on the Internet, or to gauge them during text conversations with chatbots online such as for customer service purposes, or this may be done for information collecting purposes for law enforcement and human resources organizations, and even to detect unwanted messages in services such as email and text messaging services as well as the sentiment expressed in conversations with contact center agents on various topics, e.g. relating to sales and service.

While current efforts for computing categorization and sentiment from text may be able to gauge user sentiment with some degree of accuracy some of the time, there is considerable lack of detail and a considerable margin for error in many cases using current simplistic systems. Emails may be sometimes erroneously gauged as spam, texts or messages on social networks and message-boards may be erroneously flagged for moderation or deletion, or their content may be inaccurately gauged for users searching for specific forms of content.

What is needed is a system which will analyze the sentiment of a piece of conversational text with high accuracy (precision and recall) and do so within the context of user-defined categories and to monitor the change over time of the distribution of textual data that falls within each category together with its sentiment. Furthermore, a system is needed that can also discover the emergence of new categories automatically without them having to be pre-defined.

SUMMARY OF THE INVENTION

Accordingly, the inventor has conceived, and reduced to practice, a system and method for improved categorization and sentiment analysis.

A system for categorization and sentiment analysis is disclosed, comprising: a chunk parser comprising at least a plurality of programming instructions stored in a memory and operating on at least one processor of a computer, wherein the programmable instructions, when operating on the at least one processor, cause the at least one processor to: receive input in text form; break the text into chunks of text comprising words and phrases; and compute sentiment on the text at the chunk level; and a deterministic rules engine comprising at least a plurality of programming instructions stored in a memory and operating on at least one processor of a computer, wherein the programmable instructions, when operating on the processor, cause the processor to: categorize the text into pre-defined categories using regular expression rules and store the categorization; if no regular expression rule is matched, forward the chunked text to a semantic similarity engine; and a semantic similarity engine comprising at least a plurality of programming instructions stored in a memory and operating on at least one processor of a computer, wherein the programmable instructions, when operating on the at least one processor, cause the at least one processor to: receive chunked text; represent each chunk of text as a vector embedded in a high dimensional space representing semantic characteristics of the chunked text; categorize the chunked text into pre-defined categories using a threshold semantic similarity distance (hypersphere radius) from any of a set of pre-defined anchor word sequences for each category; and if no sufficiently close match is found to any pre-defined category anchor word sequences, forward the chunked text with embedded vector dimensions to a semantic cluster discovery engine; and a semantic cluster discovery engine comprising at least a plurality of programming instructions stored in a memory and operating on at least one processor of a computer, wherein the programmable instructions, when operating on the at least one processor, cause the at least one processor to: receive chunked text with embedded vector dimensions; determine additional new categorizations for the chunked text by analyzing the text for contextual associations using a semantic clustering analysis and store the additional cluster categories; and a category and sentiment analysis engine comprising at least a plurality of programming instructions stored in a memory and operating on at least one processor of a computer, wherein the programmable instructions, when operating on the at least one processor, cause the at least one processor to: receive the input text; retrieve the categorizations of the chunked text; analyze the sentiment of categories of interest to a user of the system; and output the results of the analysis to the user in the form of text, graphics, or both.

A method for categorization and sentiment analysis is disclosed, comprising the steps of: receiving input in text form; breaking the text into chunks of text comprising words and phrases, using a chunk parser; computing sentiment on the text at the chunk level, using a chunk parser; categorizing text into pre-defined categories using regular expression rules and storing the categorization, using a deterministic rules engine; forwarding the chunked text to a semantic similarity engine if no regular expression rule is matched, using a deterministic rules engine; representing each chunk of text as a vector embedded in a high dimensional space representing semantic characteristics of the chunked text, using a semantic similarity engine; categorizing the chunked text into pre-defined categories using a threshold semantic similarity distance from any of a set of pre-defined anchor word sequences for each category, using a semantic similarity engine; forwarding the chunked text with embedded vector dimensions to a semantic cluster discovery engine if no sufficiently close match is found to a pre-defined category anchor word sequence, using a semantic similarity engine; determining additional new categorizations for the chunked text by analyzing the text for contextual associations, using a semantic cluster discovery engine; storing the additional cluster categories, using a semantic cluster discovery engine; retrieving the categorizations of the chunked text, using a category and sentiment analysis engine; analyzing the sentiment of categories of interest to a user of the system, using a category and sentiment analysis engine; and outputting the results of the analysis to the user in the form of text, graphics, or both, using a category and sentiment analysis engine.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
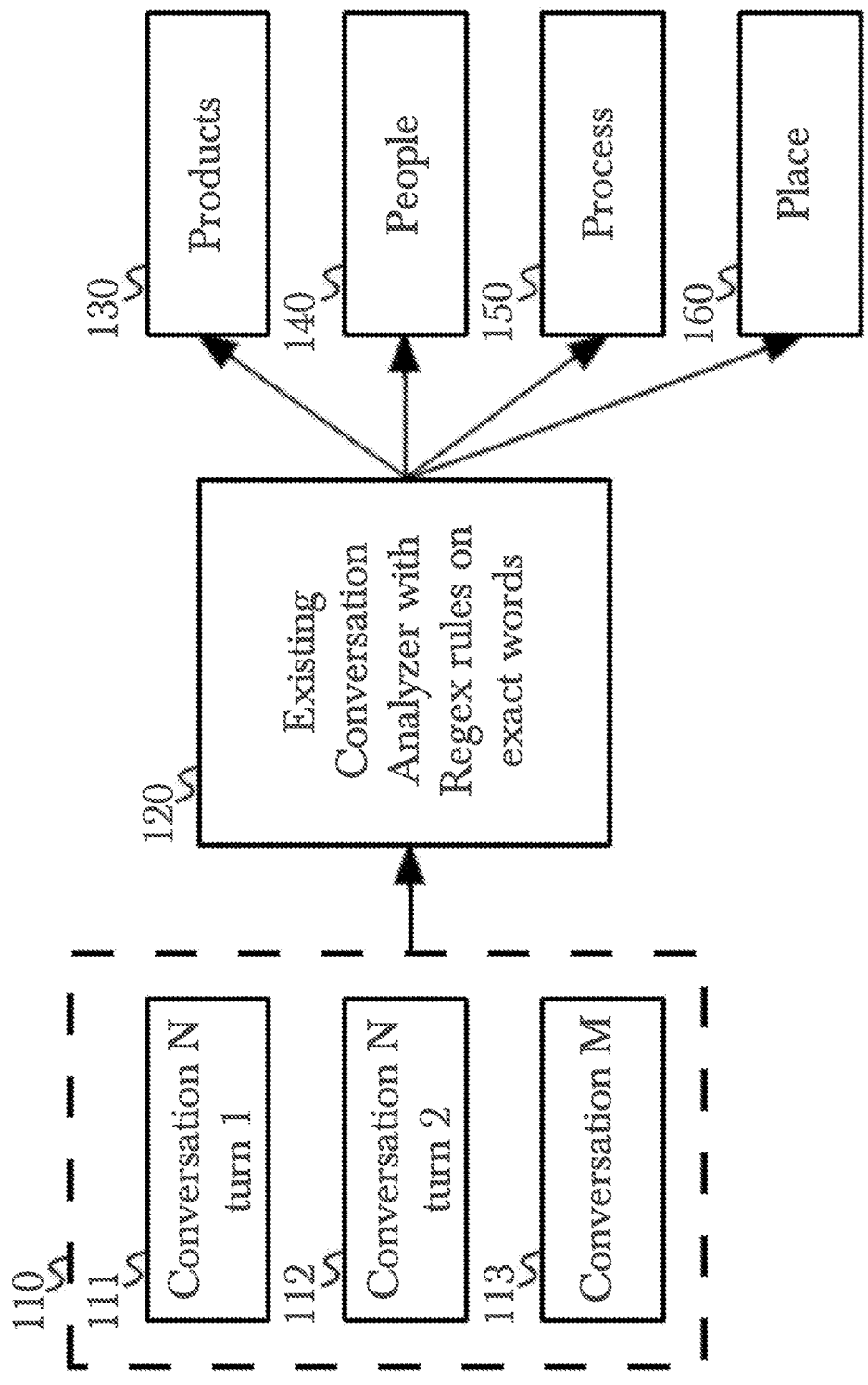
FIG. 1 (PRIOR ART) is a block diagram illustrating an exemplary architecture of a typical regular expression system and functionality to analyze categories from conversations.

The inventor has conceived, and reduced to practice, a system and method for improved categorization and sentiment analysis.

A large volume of textual information exists online, particularly where customers express opinions about products and companies. Furthermore, advances in automatic speech recognition have provided another source of textual information by allowing the conversion of voice conversations into text in near real-time. In the case of call centers, this means that phone calls can be converted to text and analyzed for emotional content. To the extent that businesses can understand the emotional content of the customer's expressions, they can take action to optimize the business/customer relationship.

The analysis of the emotional content of text-based information can be broadly separated into two forms: sentiment analysis and emotion analysis. Sentiment analysis is the simpler of the two. It attempts to identify the writer's attitude on a one-dimensional scale (e.g., positive, neutral, negative). Emotion analysis is more complex and difficult, as it requires a multi-dimensional analysis of the emotions the writer is expressing in the text (e.g. anger, sadness, fear, etc.). A non-exclusive list of other types of textual analysis includes: semantic analysis (the analysis of the writer's meaning and intent), topic extraction (the analysis or summarization of the overall topic of conversation in a writing), ideological analysis (placing the writer's opinion within a certain ideological classification), and quantitative analysis (how many times a certain thing is mentioned).

Existing text analysis systems are inefficient and often not very effective; to obtain an acceptable level of accuracy, they generally require a large body of words and phrases to be created and manually tagged with emotional information by humans. This process is slow, cumbersome, and expensive and each body of words and phrases is limited to use in the specific context or field for which it was created. Even with a large body of words and phrases, many of the approaches currently used provide less than optimal results even with a large body of words and phrases.

Another challenge is the lack of emotionally labelled text data in a particular business domain. A specific business domain may have a unique lexicon (vocabulary) relating to specific products and services and business-specific patterns of text. These special words resulting to the business would rarely be used with emotion in general English usages outside of the business.

A taxonomy of desired categories of entities that are involved in a specific business are not hard for a subject matter expert to define in advance. For example, Products, People, Places and Processes. However, assigning entities or short phrases that occur in the text to each of these categories in terms of a set of fixed rules is tedious because the names of all people, products, places and processes would have to be specified in advance together with the rules to associate them to each specific target category. For example, "Robert" to People, "Mary" to People, "caller" to People, "agent to People" etc. Moreover, as people and products change over time the assignment rules need to be kept up to date.

One approach to simplify this process may be by first specifying only one common example of a word or word sequence that is typical for each category, called an "anchor" word or word sequence. One may then leverage a pre-trained word sequence embedding model that has been trained on common general language usage to identify incoming words or word sequences which are semantically close to these predefined anchors. In this way one can then define an entire entity category by giving a single example of an instance of it instead of an exhaustive list with rules to map each word to the category also taking into account variations like plurals or even common mis-spellings. Some categories may be homogenous, consisting of entities that fall very close to each other in semantic space. For example, if a company only sells fruit as their products, it is possible to define the whole product category through the use of a single "anchor" entity expressed as ("banana", 0.8). It is then possible to assign any incoming word (or word sequence) to the product category if the embedding vector of the incoming word (or sequence) is within a (semantic) distance of 0.8 in the embedding space from the pre-specified anchor word "banana". The use of a real number distance threshold like 0.8 allows to define the "tightness" around the anchor word phrase. A small value of the tightness results in only accepting words which are very close to "banana" in meaning, whereas a large value will match broader names of fruit, and if the "tightness" is set too large it will include other entities increasingly dissimilar to fruit and ultimately entities that are not fruit. In the case where a category consists of very heterogenous entities, e.g. a company whose products are fruit and musical instruments, then the system can be given "anchor" words for each subgroup within a category, such as [("banana",0.8), ("piano",0.8)]. It is also possible there may be a very domain-specific use of language around a company where product names differ broadly from their common use in English. For example, "apple" may refer to the name of a company rather than a fruit. In such a case, the system may apply exceptional rules for pattern matching of words to categories before the text is then passed to the approach using semantic similarity based on common usage.

There are deep learning models that have been trained on large datasets that have been labelled by humans, such as "Recursive Deep Models for Semantic Compositionality Over a Sentiment Treebank" by Socher et al. However, the aim of these models is to improve the state of the art for sentiment detection on single sentences or phrases compared to human judges. The current invention concerns the task of how sentiment analysis is combined with categorization of sequential portions of text in such a way that: sentiment is tracked about pre-defined categories in the business (e.g. people, process, products, places, etc.). If no match is found to any pre-defined category, new emerging categories (non-predefined) can be automatically discovered and tracked dynamically, i.e. the system adapts category discovery over time. The pre-defined categories can be easily configured for different businesses (business "taxonomies") by non-experts (non-data scientists). The system requires little or no training data so that the system can be put into production from day 1 of deployment in a new environment. The system avoids the need for complex rule and pattern matching configuration for new environments; and the system has a highly flexible but logical sequence of categorization techniques following the sequence (i) fixed rule, followed by (ii) soft semantic hypersphere, followed by (iii) cluster discovery.

The system uses semantic vector embedding spaces to find soft semantic matching to a pre-defined category by way of sentiment distance, but is implemented in a modular way where the specific vector space embedding module can be swapped from one type to another (e.g. sentence2vec, "universal sentence encoder", "paragraph2vec", "Paragraph Vector" or even simpler non sequence that use only the distributional similarities of single words like word2vec, or other semantic vector techniques to be invented in the future The system further allows the method of sentiment analysis on the portion of text to be swapped with another in a modular way.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Corpus" as used herein means a collection of natural language words, phrases, or both. The words and phrases in the corpus may optionally by tagged with emotional information for use in performing textual analysis.

"Emotion analysis" and "Emotion classification" as used herein have the same meaning, and refer to the automatic detection of the emotions that a writer is experiencing in relation to an entity from an analysis of the text of the writing. Emotion analysis is multi-dimensional, and thus more complex and difficult, than one-dimensional sentiment analysis.

"Emotional content" as used herein means the emotions that a writer is experiencing in relation to an entity.

"Lexicon" as used herein means vector information for each word or phrase in the corpus that provides information regarding meaning, associations, relationships, sentiment, emotion, and other information useful for performing textual analysis.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information.

"Sentiment" as used herein means the writer's attitude toward an entity. The sentiment (sometimes called "polarity" or "valence") of a text is typically classified into a three-value scale (positive, neutral, negative) or a five-value scale (very positive, positive, neutral, negative, very negative).

"Sentiment analysis" as used herein means the automatic detection of a writer's attitude toward an entity from an analysis of the text of the writing. The goal of sentiment analysis is to determine the sentiment expressed by the writer of the text, or phrases, and sentences within the text.

The term "categorization" is used here to mean the assignment of a portion of text concerning entities or collections of entities of interest to a business or organizational category that can be either very fine grained, broad, grouped or also hierarchical in nature. The category can cover any type of physical or conceptual entity (e.g. people, products, process, places, digital assets, etc.). This contrasts with "topic extraction" the purpose of which is to simply summarize a larger amount of text to simply understand what it is about. Having fine grained categories is important in order to make the observed sentiment actionable. The category defines what the sentiment is being expressed about so that category can be independently managed and improved.

Conceptual Architecture

FIG. 1 (PRIOR ART) is a block diagram illustrating an exemplary architecture of a typical regular expression system and functionality to categorize conversations. A possible series of conversation textual data 110 is present, consisting of at least one turn in at least one conversation 111, and possibly other turns from other people in a conversation 112, and possibly containing more than one conversation 113. In this prior art a "turn" is one side of a party in a conversation and can be quite long in length. Such data is read by a conversation analyzer using regular expressions 120 on the words used in such conversational data 110. Examples of regular expressions, without regard to a specific syntax or methodology, may include such things as searching a sentence for nouns that will e.g. categorize a turn as relating to a category "Products" by e.g. explicitly mentioning an exact name of a product. In addition, qualifiers such as "good," "bad," "great," "enjoyed," or other such emotional qualifiers, as is both commonplace in such sentiment analyzers and commonplace in the technical specifications of regular expressions, which are designed to find basic patterns in textual data rapidly. Such things that may be located out of a textual piece of data 110 may include product names or brands 130, names or titles of people 140, names of processes 150, and names or possible descriptions of locations and physical places 160. Such pattern and word matching is commonplace and easy to perform with basic regular expression techniques in a conversation analyzer 120 which may be any number of specific implementations such as a library in a programming language, or a separate application for text processing, or another common implementation of a regular expression system 120.

Figure 3:
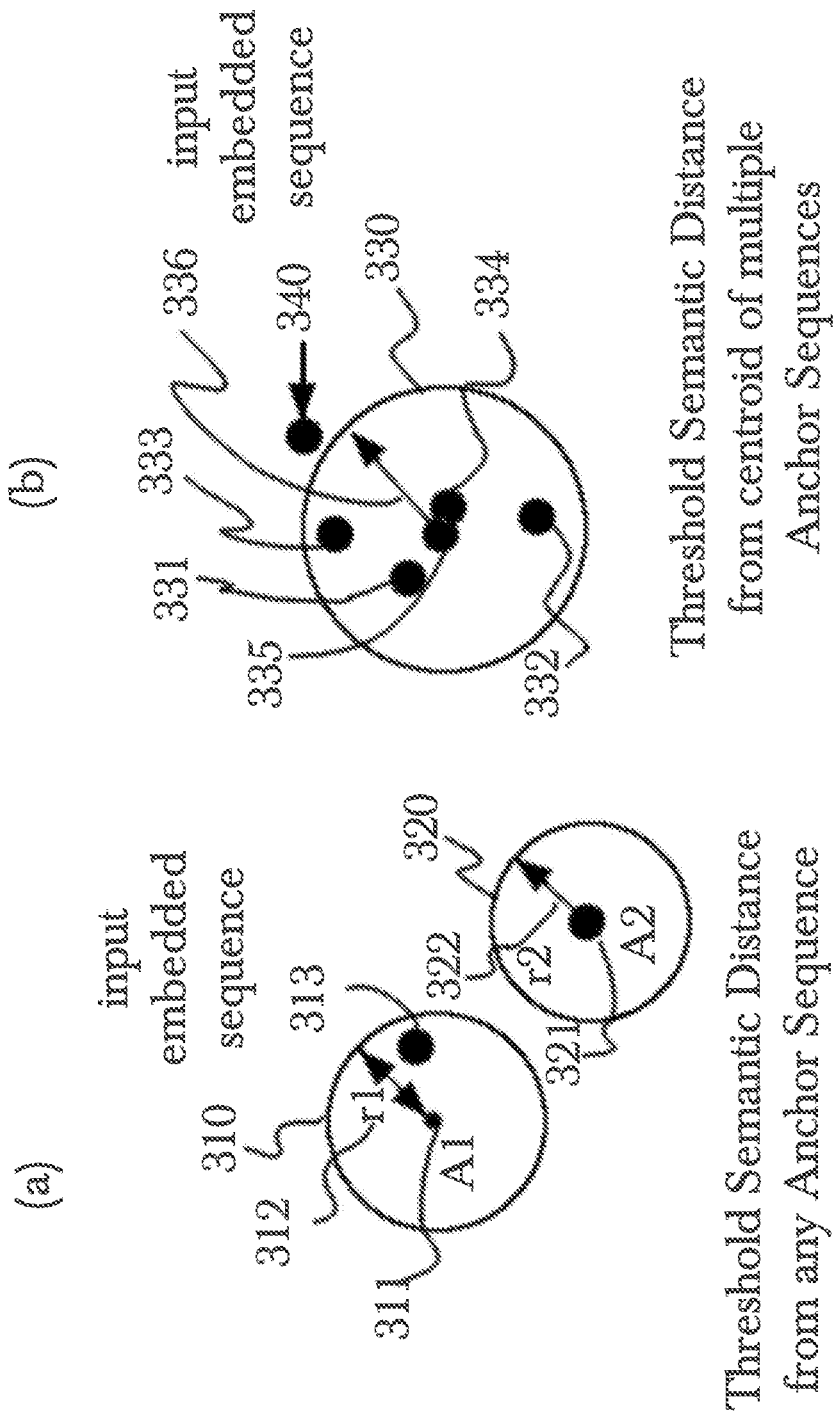
FIG. 3 is a diagram of differing techniques for assigning an input word sequence to a pre-defined category using a semantic distance "hypersphere" approach.

FIG. 3 is a diagram showing two different approaches to assigning an input embedded word sequence vector 313 (shown here as a point projected onto a 2 dimensional plane however typically the vectors have several hundred dimensions) to a single pre-defined category "C" of interest using a semantic distance "hypersphere" approach. The black dots $A_1$ 311 and $A_2$ 321, represent anchor points also in a 2-dimensional projection 310, 320 of the high dimensional embedding vectors of the "anchor" text sequences used to pre-define a single category C. In the method on the left, the input embedded sequence vector 313 is assigned to the category C of interest if the distance from the input embedded sequence vector 313 to ANY anchor sequence vector 311, 321 is less than some threshold tightness distance "$r_1$" or "$r_2$" 312, 322 respectively for each anchor sequence vector 311, 321. In the figure FIG. 3 the input embedded sequence vector 313 falls within a threshold tightness distance $r_1$ 312 from anchor sequence vector $A_1$ 311 and so the input embedded sequence vector 313 is associated with category C, but this same input embedded sequence vector 313 falls outside the distance "$r_2$" 322 from the anchor sequence vector $A_2$ 321 so it is not semantically close enough for $A_2$ 321 to be the cause of it being associated with the same category C. If the input embedded sequence vector 313, falls outside both distances $r_1$ 312 from $A_1$ 311 and $r_2$ 322 from $A_2$ 321 then there is no semantic match made to any anchor sequence vector 311, 321 of category C and so the input embedded sequence vector 313, is not associated with category C. An alternate inferior approach is shown on the right-hand side 330 where the centroid 335 of in this example 4 anchor embedded sequence vectors 331-334 for a category "D" is first computed and then the input embedded sequence vector 340 is assigned to the category D only if it is less than a threshold distance "r" 336 from the centroid 335 of all 4 defining embedding sequences 331-334. The method on the left is preferred and performs particularly well when the anchor embedded sequence vectors 313 and category are quite semantically heterogenous as described earlier. For example if a company sold products "apples", "oranges", "peaches" and "bananas", where in this simple case each anchor sequence 331-334 is only a single word, and these were used as the anchor sequences for the Product category, then the centroid 335 is also close to each embedded anchor vector 331-334 because they are all fruit and are semantically closed so the results of the approaches on the left and on the right would be similar. However if a company's products were quite semantically different, e.g. "apples", "shoes", "pencils" and "computers" then the centroid 335 of the embedded anchor vectors 331-334 is a blurred semantic "average" over the very different products and is not a good reference point for assigning the input embedded sequence vector 340 to the category.

Figure 4:
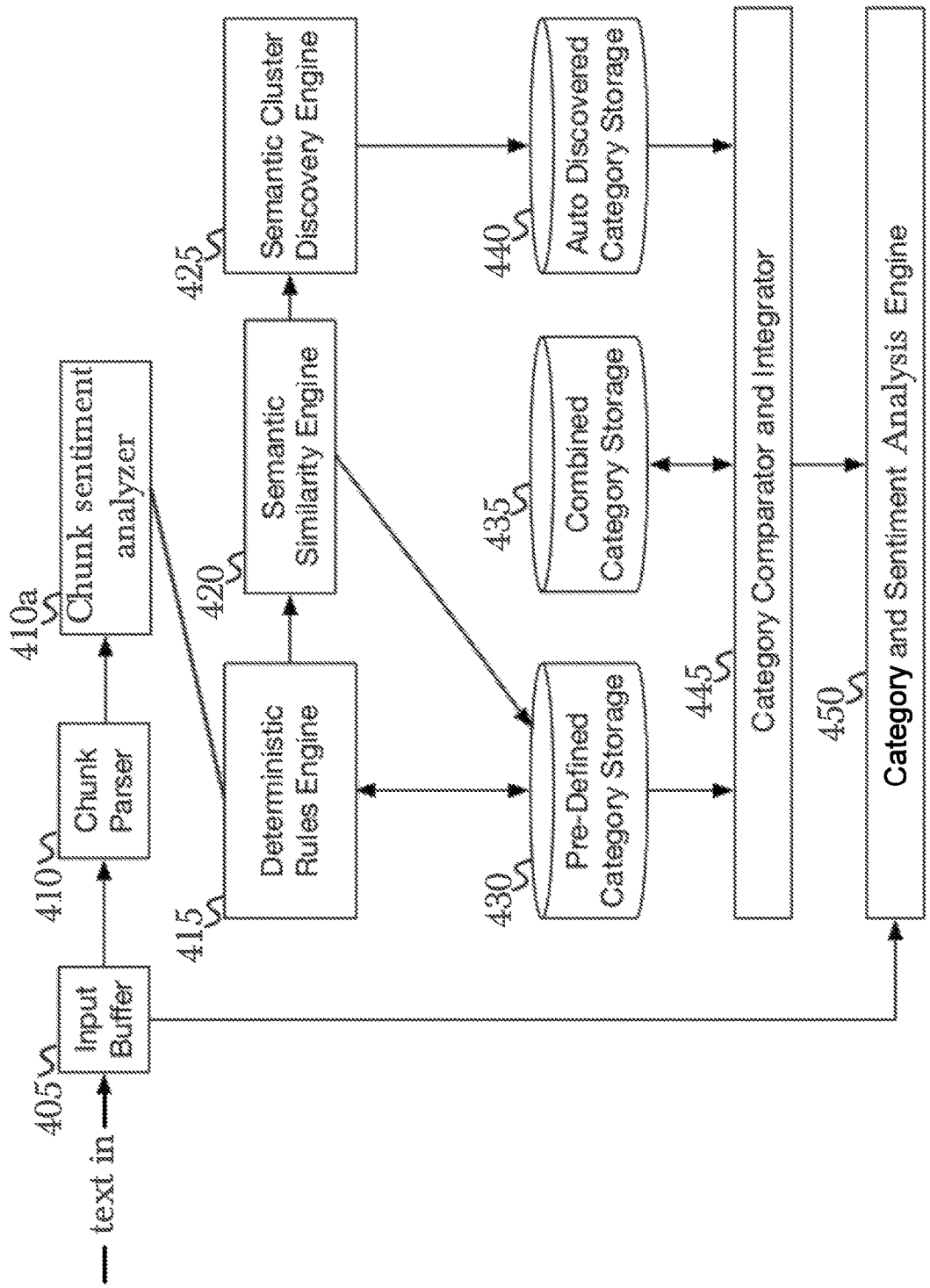
FIG. 4 is a block diagram of a system architecture for semantic sentiment analysis, according to a preferred aspect.

FIG. 4 is a block diagram of a system architecture for semantic sentiment analysis, according to a preferred aspect. Text input is provided 205, which may be accomplished using many methods to input text into a function or application as is common in the art including manual entry, web crawling, surveying users, and more, and such input is loaded into an input buffer 405. An input buffer 405 sends, once input data is loaded into the buffer, to both a final category and sentiment analysis engine 450 and a chunk parser 410. A chunk parser 410 is capable of and responsible for partitioning provided buffered input into chunks determined by e.g. parts of speech (PoS) parsing and may be configured to ignore certain words, characters, or sentences based on content, according to a preferred aspect. After buffered 405 input 205 is parsed into chunks 410, chunks are sent to a sentiment module 410a which computes sentiment at the chunk level and then passes it on to a deterministic rules engine 415 which uses deterministic rules to assign chunks to pre-defined categories by pattern matching, which it then stores 430. If the hard rules find no match in the chunk, the chunk is then sent to a semantic similarity engine 420 which then reduces the chunk further into a possibly reduced "sequence" of words (e.g. by selecting only the nouns in the sequence or up to and including the whole chunk) that it will embed into a semantic vector space to become an embedded sequence vector. Threshold semantic distance analysis with a single anchor point 310, 320 is then used to attempt to match the input embedded sequence vector to a pre-defined anchor sequence vector. If a match is found the semantic match is stored in 430. If no match is found, the input sequence embedding vector is then sent from the semantic similarity engine 420 to a semantic cluster discovery engine 425 to determine clusters of semantically similar input embedding vectors, which represents further categorization metadata and sentiment analysis opportunity for the system. Data is examined in the semantic cluster discovery engine 425 for non-predefined categories which may be procedurally generated by clustering to attempt to discover additional cluster categories to describe a given chunk of data. The semantic cluster discovery engine 425 stores the new or additional cluster categories in the auto discovered category storage 440. Category data from pre-defined category storage 430 and auto-discovered category storage 440 for a given chunk of data is retrieved by the category and sentiment analysis engine 450, and compared and integrated together 445, to provide a comprehensive data profile of the categories of semantics, and such results are then stored in a combined category storage unit 435. Buffered input 405 and an integrated category 445 profile are both processed in a category and sentiment analysis engine 450, which processes the raw text and the metadata about the categories within different chunks of the data, and analyzes categories and sentiments expressed within the data, and displays the results of the analysis to the user in the form of text, graphics, or both, enabling for example, filtering by category, cross tabbing, pivoting and graphical chart views of the data including breakdowns by category, sorting by sentiment and showing trends over time.

Figure 5:
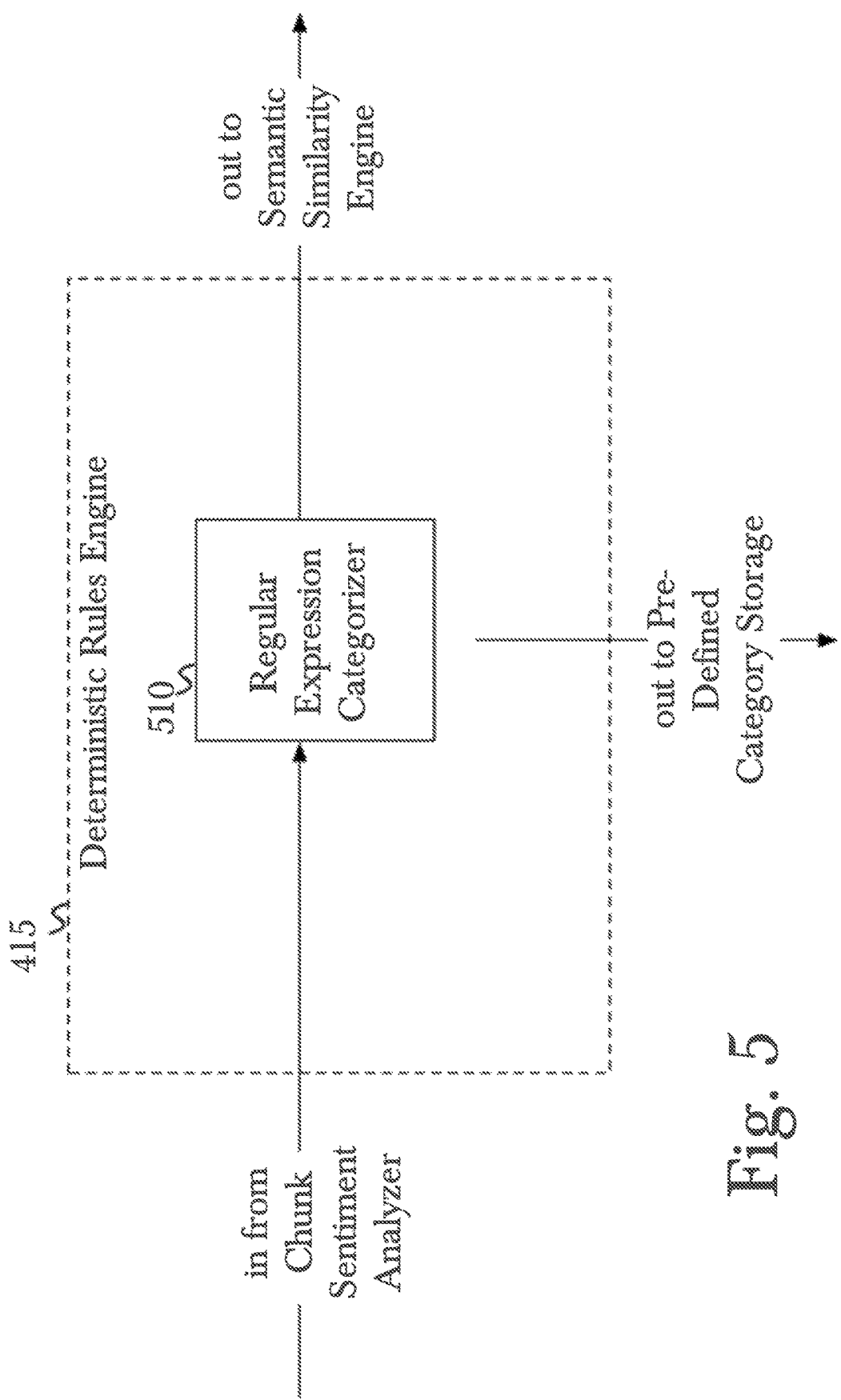
FIG. 5 is a block diagram of core components in a deterministic rules engine, according to a preferred aspect.

FIG. 5 is a block diagram of core components in a deterministic rules engine 415, according to a preferred aspect. Input from the compute sentiment at the chunk level 411 is fed into a deterministic rules engine 415. A regular expression categorizer 510 is responsible for the actual pattern matching, and sends its output, after using an initial regular expression pattern search to find category matches, to both a semantic similarity engine 420 and a pre-defined category storage 430 to store the results of the deterministic category matching.

Figure 6:
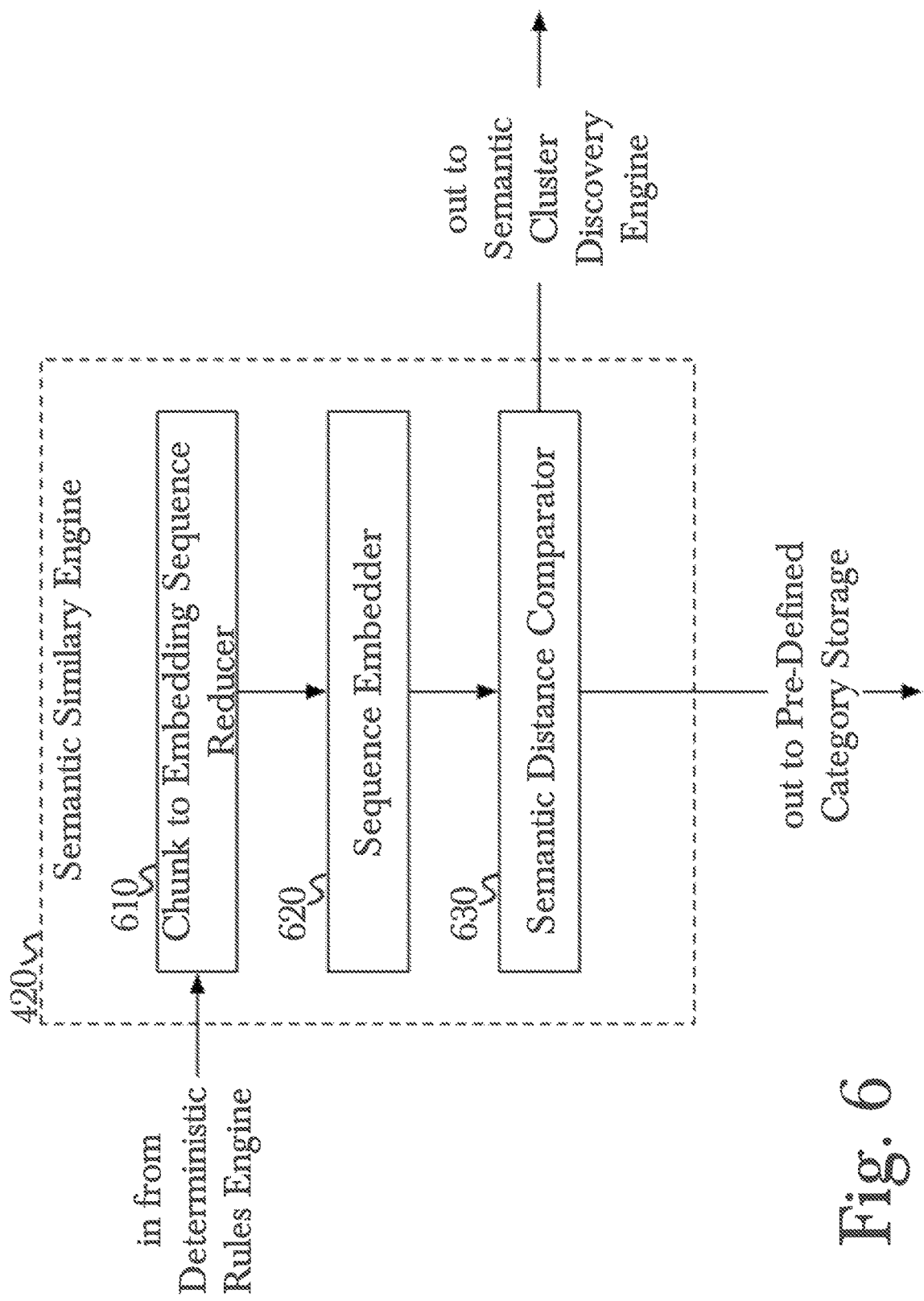
FIG. 6 is a block diagram of core components in a semantic similarity engine, according to a preferred aspect.

FIG. 6 is a block diagram of core components in a semantic similarity engine 420, according to a preferred aspect. Input chunks are received from a deterministic rules engine 415 and fed into a chunk to embedding sequence reducer 610 which reduces the chunk further into a possibly reduced "sequence" of words (e.g. by selecting only the nouns in the sequence or up to and including the whole chunk). The embedding sequence preserves the order of words from the original text and is different from a "bag of words" approach where word order is not important. For example "North America" has a distinct meaning to simply the presence of the words "America" and "North". The resulting embedding sequence of words is then sent to the sequence embedder 620, which will embed each input word sequence into a high dimensional vector according to the chosen sequence embedding model (e.g. Phrase2Vec as discussed above) which provides a numeric form of measuring the semantic meanings of a particular word sequence, to be used to determine the category as follows. A semantic distance comparator 630 determines the proximity of each input embedded sequence vector to the pre-defined Anchor Sequence vectors for each potential category match according to the method of FIG. 3(a) to find whether a semantic match has been made to a category or not. Output from the semantic similarity engine 420, specifically from the semantic distance comparator 630, is then sent to a pre-defined category storage unit 430 and to a semantic cluster discovery engine 425 for unsupervised categorization via clustering.

Figure 7:
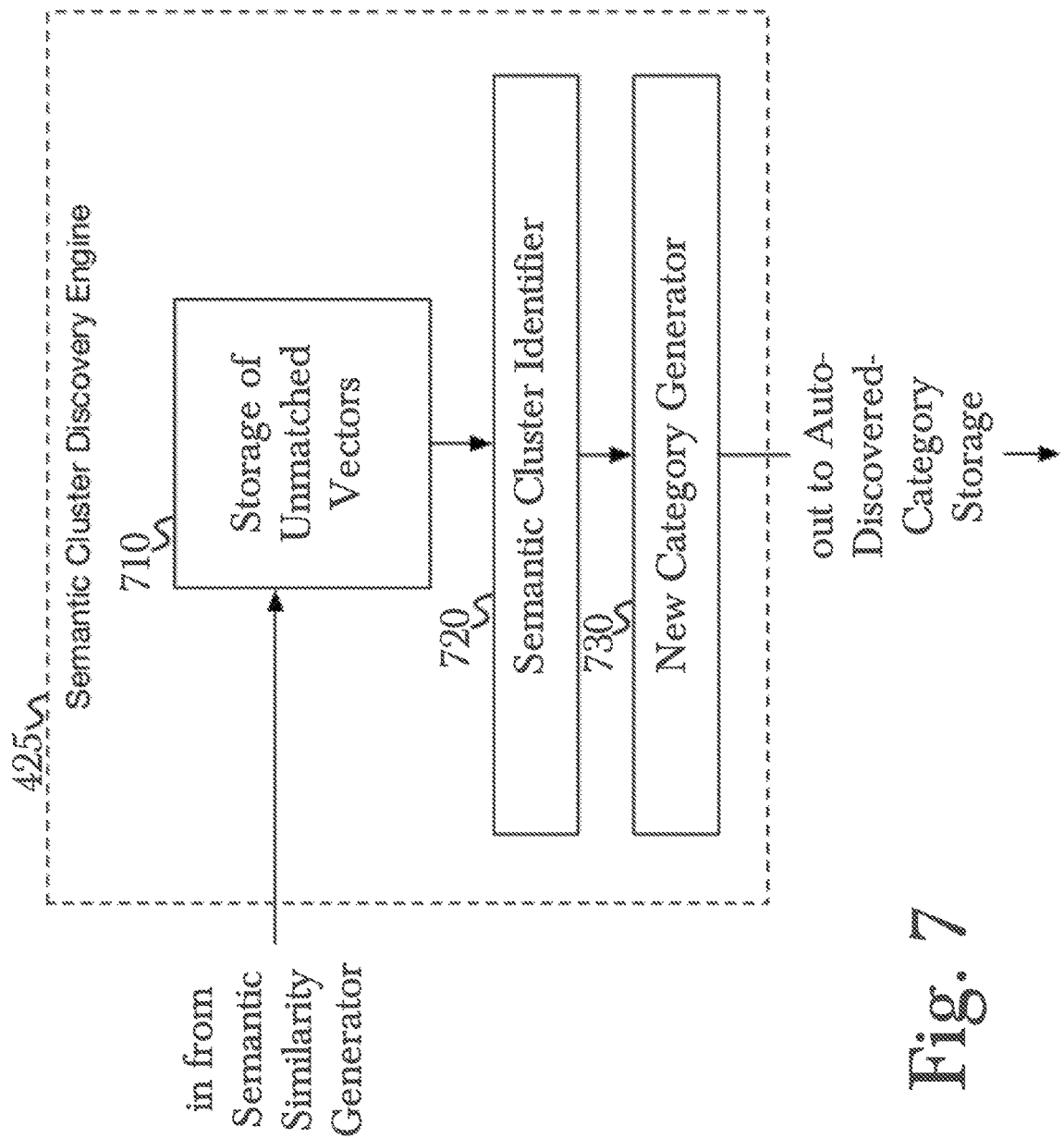
FIG. 7 is a block diagram of core components in a semantic cluster discovery engine, according to a preferred aspect.

FIG. 7 is a block diagram of core components in a semantic cluster discovery engine 425, according to a preferred aspect. Input is received from a semantic similarity generator 420, and added to a storage area of previously unmatched embedded vectors 710. The semantic cluster identifier 720 finds possible clusters present in the accumulated unmatched vectors, before sending the data to a new category generator 730, for the purpose of generating new categories for possibly multi-semantic-anchor datasets, to analyze clusters of semantic data chunks.

Figure 8:
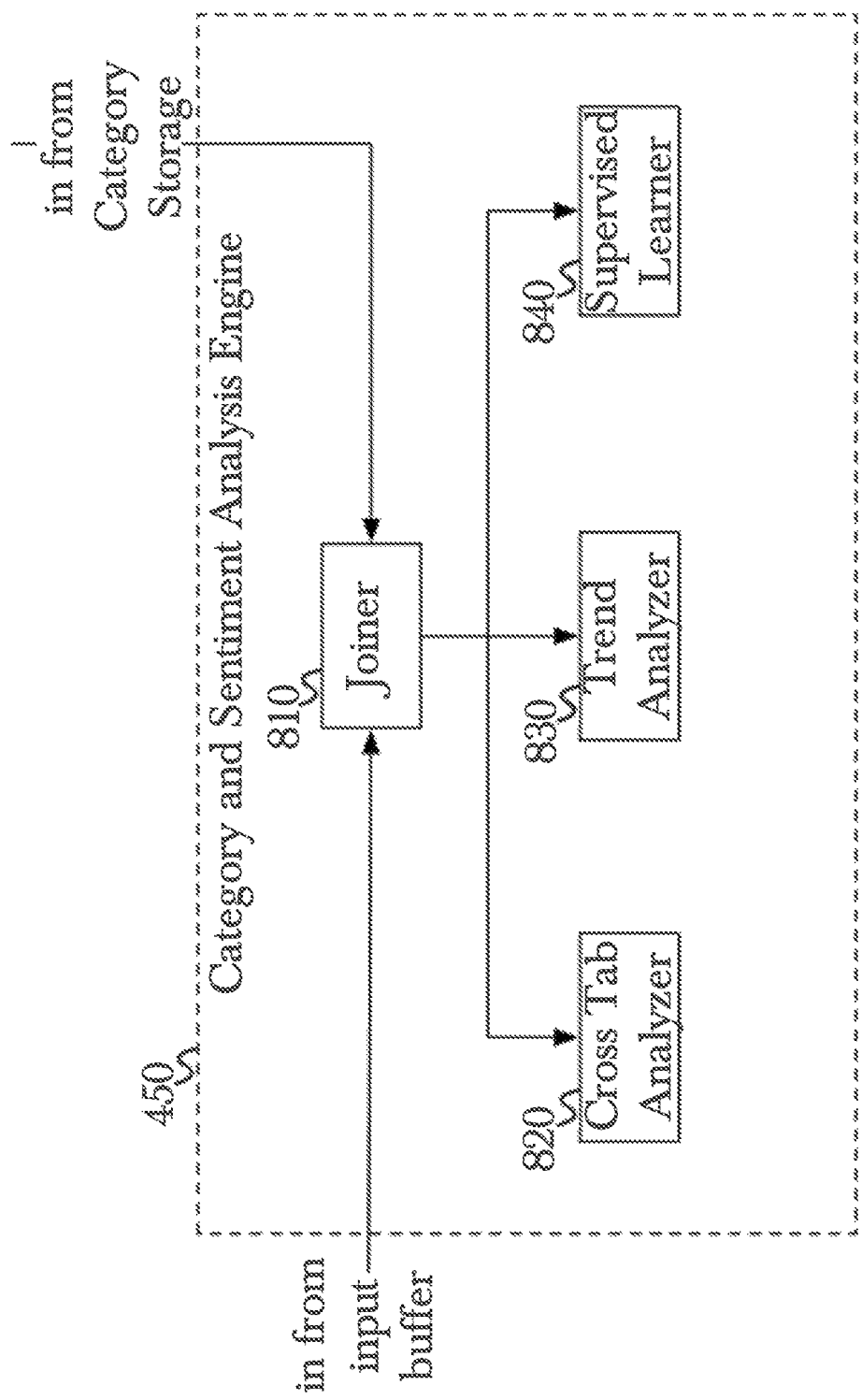
FIG. 8 is a block diagram of core components in a category and sentiment analysis engine, according to a preferred aspect.

FIG. 8 is a block diagram of core components in a category and sentiment analysis engine 450, according to a preferred aspect. Input from category storage units 430, 435, 440, as well as from buffered but unprocessed input 405, is all joined together in a full text joiner 810, which joins all category IDs (pre-defined and discovered), sentiment, text chunks and embedding word sequences and metadata so far gathered and generated preserving the positions and range of each text item in the original text and also joins with other structured data attributes relating e.g. to the people (customer, customer segment, employees, location, channel, line of business etc.) involved in the conversation or text, plus joining with other available data using on the output category IDs. The joined dataset is then passed to three additional components. A cross tab analyzer 820 which enables an end-user to manually analyze, aggregate and sort tabular or graphical output by any of the described attributes or categories in the taxonomy, for example to show the conversations with extreme high and low sentiment concerning any category or level in the business taxonomy of categories. Based on the results the end-user of the system may want to "promote" a newly discovered cluster to become a regular-predefined category by causing a step to be taken that stores the centroid of the discovered cluster and its radius as a new pre-defined category with a tightness radius and having a convenient category name potentially given to it by the end-user. The joined data is also sent to the trend analyzer 830, which analyses and displays the time dynamics of the number of and proportion of texts in each category highlighting for the user the growth or decline of categories as well as optionally creating an automated management alert which is triggered when an emerging category grows rapidly and has for example a strong negative sentiment. The joined data is also sent to the supervised learner 840 (e.g. a decision tree) which takes all structured data attributes from the joiner including the category ID and sentiment level and learns the relation between attributes, so it can for example predict which combination of structured attributes is likely to results in texts that has strongly negative sentiment in a particular business category. In addition variable influence scores from the supervised output can highlight to the user which structured data attributes are contribution most to the likelihood of negative sentiment on a particular category.

Note also that as described above a typical configuration is to follow the procedure of dividing the input text into noun phrase chunks, calculate the sentiment on the chunks, then reduce to only short noun sequences by the reducer 610 while performing the semantic embedding in the semantic similarity engine 420. By removing sentiment-laden adjectives before embedding we have effectively separated sentiment as an orthogonal dimension by which we can analyze the semantic categories. However, by the minor change of allowing the reducer 610 to do less filtering and also include adjectives and other emotion-laden words we can have categories that also include emotion. For example, "friendly assistant" and "unfriendly assistant" can be separate pre-defined or discovered categories instead of having a single pre-defined or discovered category "assistant" with cases where it has positive sentiment and others with negative sentiment. So, by changing the filtering on the reducer 610 prior to embedding we can alter the balance between relying on the need to have co-occurrence of any kind of rare emotion-laden language near entities that were present in the text corpus used to create the embeddings model versus utilizing the language co-occurrence in the input string.

DETAILED DESCRIPTION OF PREFERRED ASPECTS

Figure 2:
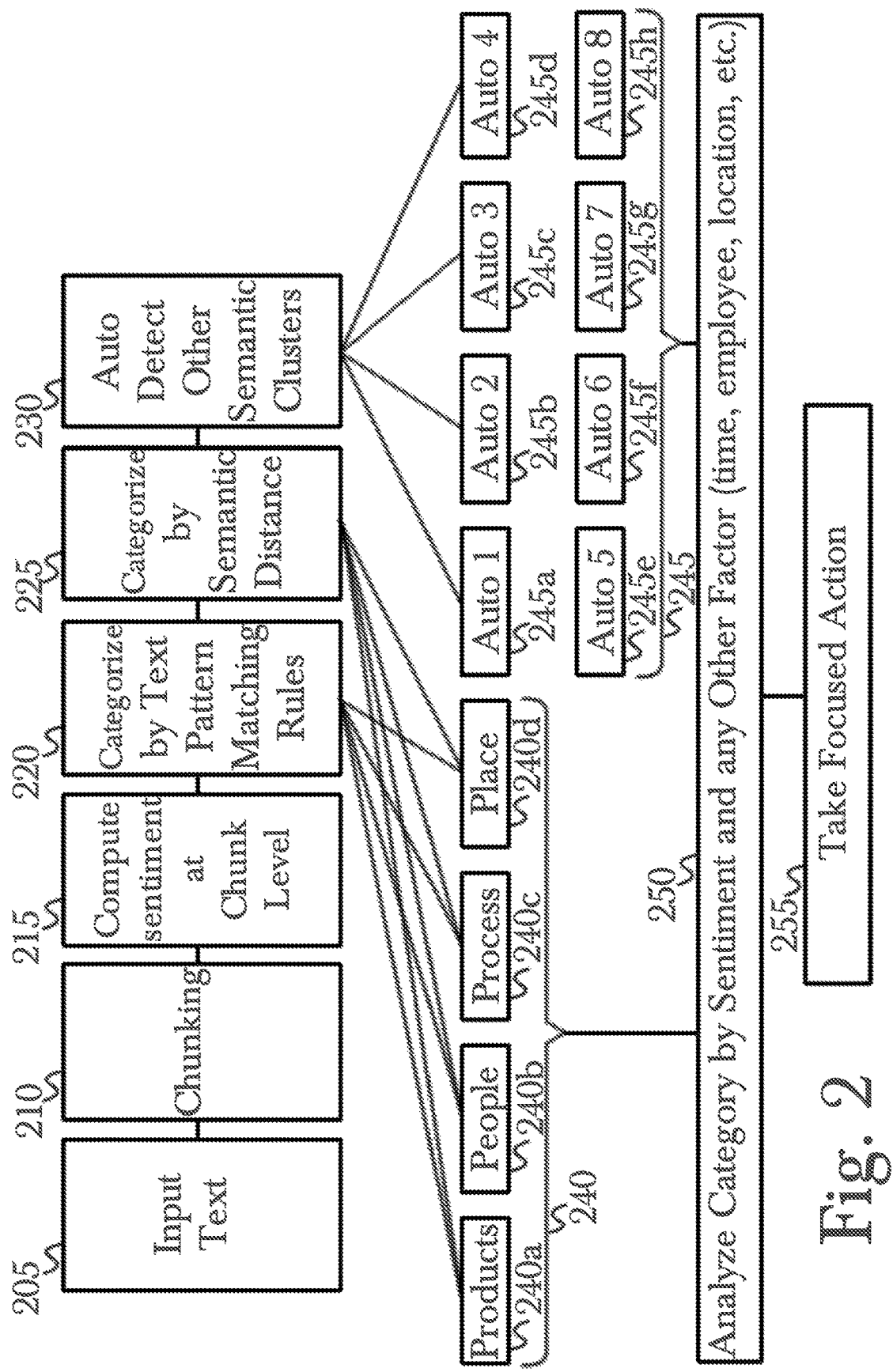
FIG. 2 is a method diagram of a system to analyze sentiment and categories in conversations from users using new text analysis techniques, and specific sequence of steps taken to begin an initial parsing and analysis of text to ready it for further analysis according to a preferred embodiment.

FIG. 2 is a block diagram of a method of a system to analyze sentiment in conversations from users using new text analysis techniques, according to a preferred embodiment. Input text is provided 205 which may be transcriptions of natural speech, or surveys, or some other common source of possible natural language text 205. This text is split into chunks 210, using a chunk parser 410, which may split input text 205 into chunks based on parts of speech (e.g. noun phrases), word separators, sentence separation, number of characters, number of words, or some other desirable separation technique. The sentiment is then computed at the chunk level 215. Two different categorization modules then attempt to find a pre-defined category for the chunk. The first 220 uses simple rules and pattern matching (e.g. REGEX) which searches through a given chunk for any of the matches 240, including e.g. product names or brands 240a, people and personal names 240b, process titles and technical phrases 240c, or places and physical locations by name 240d. If a match is found the process stops and the chunk is assigned to the matched category. If no match is found the processing continues to categorization using semantic distance 225 is performed using a chunk to embedding sequence reducer 610, a sequence embedder 620 and a semantic distance comparator 630. Auto discovery of other semantic clusters 230 occurs next, generating a plurality 245 of auto-generated categories 245a-245h using a new category generator 750, and both new 230 and pre-defined 220,225 categories are analyzed along with other factors in data chunks including a given perceived sentiment or a time period 250. Finally, focused action is taken 255, which involves extracting the final category, context, and sentiment values using a category and sentiment analysis engine 450, and allowing analysts or other users of the system to take action based on the results of the detailed sentiment and semantic analysis of the given data.

Figure 13:
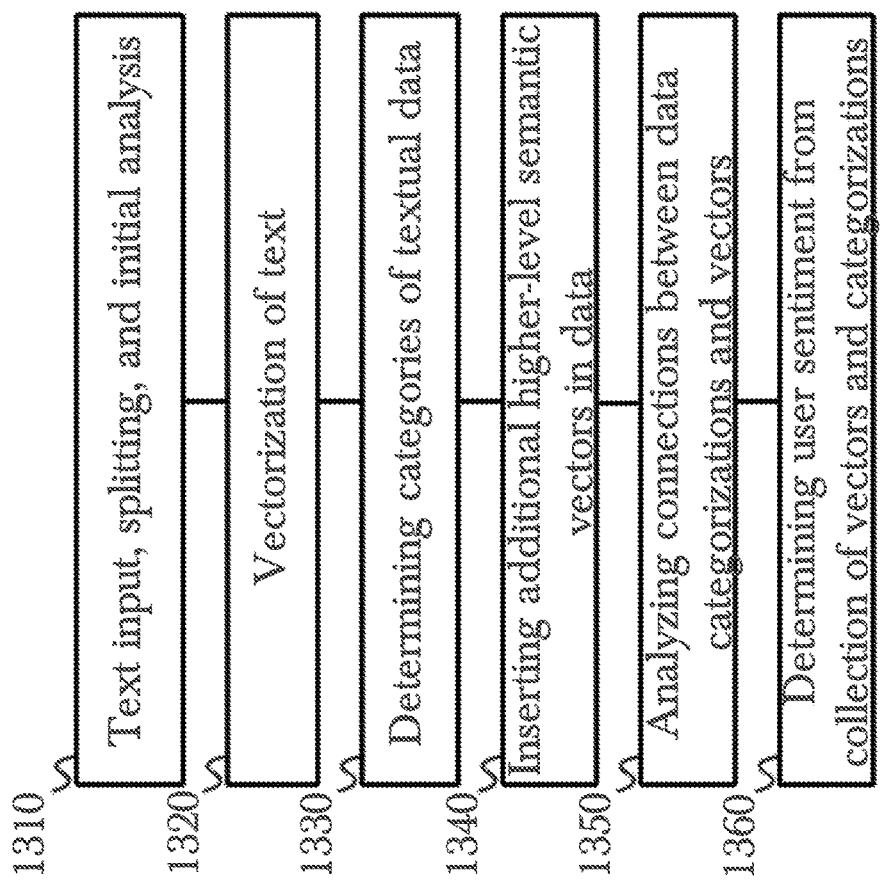
FIG. 13 is a method diagram illustrating key high-level functionality and steps taken in the operation of a category detection and sentiment analysis system, according to a preferred embodiment.

FIG. 13 is a method diagram illustrating key high-level functionality and steps taken in the operation of a category assignment and sentiment analysis system, according to a preferred embodiment. Initial text data reception, parsing, and analysis 1310 is performed in FIG. 2 by a variety of components including a deterministic rules engine 415. Vectorization of text 1320 is accomplished initially using a chunk-to-embedding sequence reducer 610 in a semantic similarity engine 420, which embeds a vector as metadata in a chunk, or alternatively this may be understood as generating additional data which is kept separate from the initial input text 405 and processed alongside it throughout the system, as metadata or "data about data." Categories are also determined after textual analysis 1330, through the use of a sequence embedder 620 which embeds sequences of words or a sequence of characters into metadata for semantic threshold analysis, and a semantic distance comparator 630 in a semantic similarity engine 420. These components draw correlations between categories and semantic vectors already determined about textual data, and compose or generate new categories and metadata about these relationships and a "bigger picture" view of the data, and do not have pre-determined or preset categories to choose from, unlike the operation of a deterministic rules engine 415. Categories may also be merged or new categories synthesized from two other categories identified in a chunk of text, according to a preferred aspect. Insertion of these categories and higher-level vectors 1340 is accomplished using a semantic similarity engine 420, resulting in metadata that describes trends and larger-scope information about a given chunk, or this may be thought of as meta-metadata. Further, an analysis of the connections between all of the present vectors and categories is performed 1350, using a semantic cluster discovery engine 425, especially using subcomponents including an unmatched vector storage unit 710, a semantic cluster identifier 720, and a new category generator 730, which may be used to analyze the varying semantic clusters and the respective semantic "directions" they may pull a given chunk or complete set of textual data, or a time evolution analyzer 720 may be used to analyze a shift in categories over the timeline of a discussion input, or a sentiment analyzer 730 may be used to analyze sentiment-giving words or phrases such as "hate" or "love," or "enjoyable evening." A semantic cluster identifier 740 and new category generator 750 are further used in the task of analyzing all vectors and categories 1350, identifying clusters of semantically similar phrases or chunk and generating alternative new categories if needed to describe these semantic clusters. Lastly, using the vectors, categories, and clusters described previously, user sentiment is determined 1360 using a category and sentiment analysis engine 450, parsing all text 810 and metadata collected thus far to extract the categories of discussion 820, analyze the context of pieces of conversation 830, and determine user sentiment or "feeling" 840 based on all collected data.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
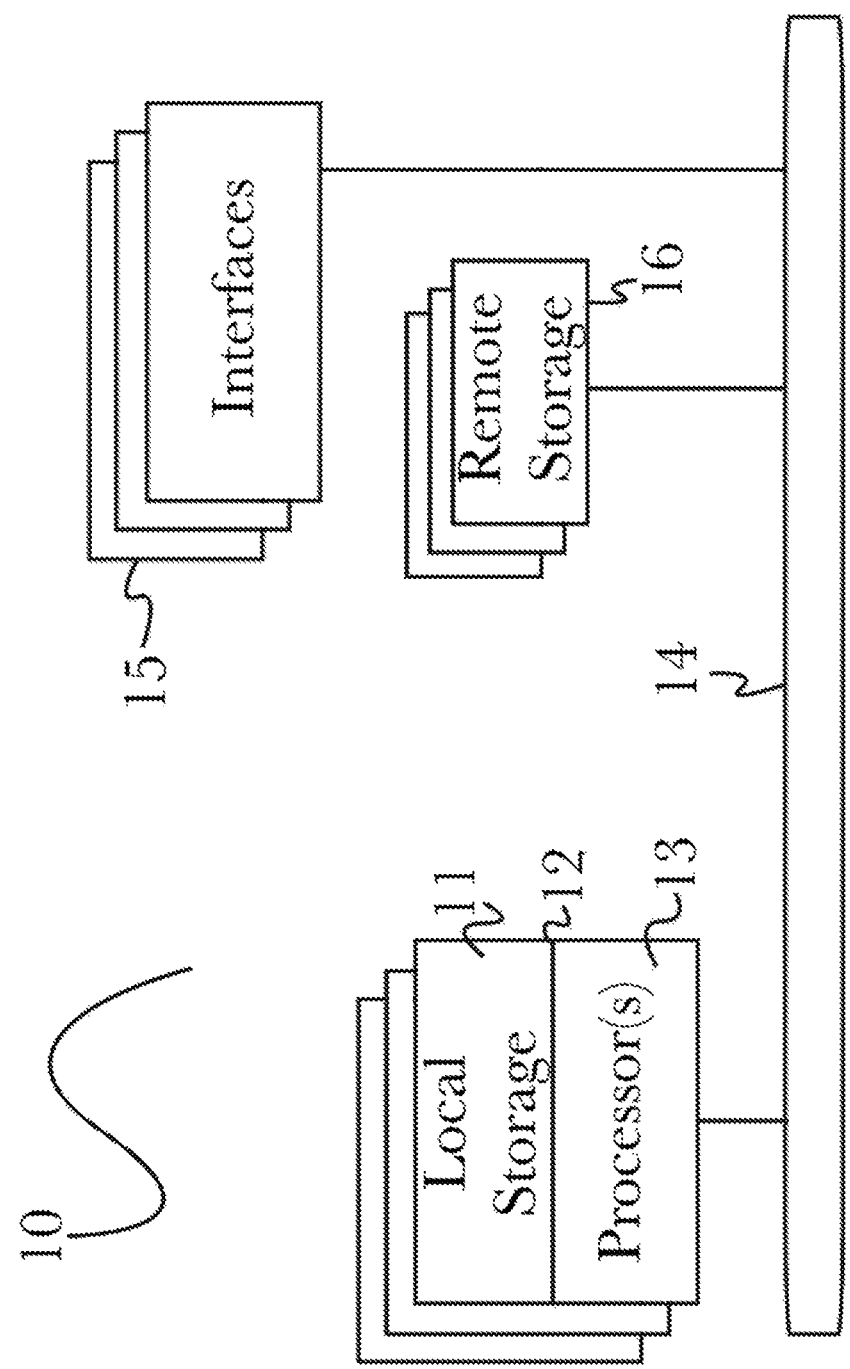
FIG. 9 is a block diagram illustrating an exemplary hardware architecture of a computing device.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of the present aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
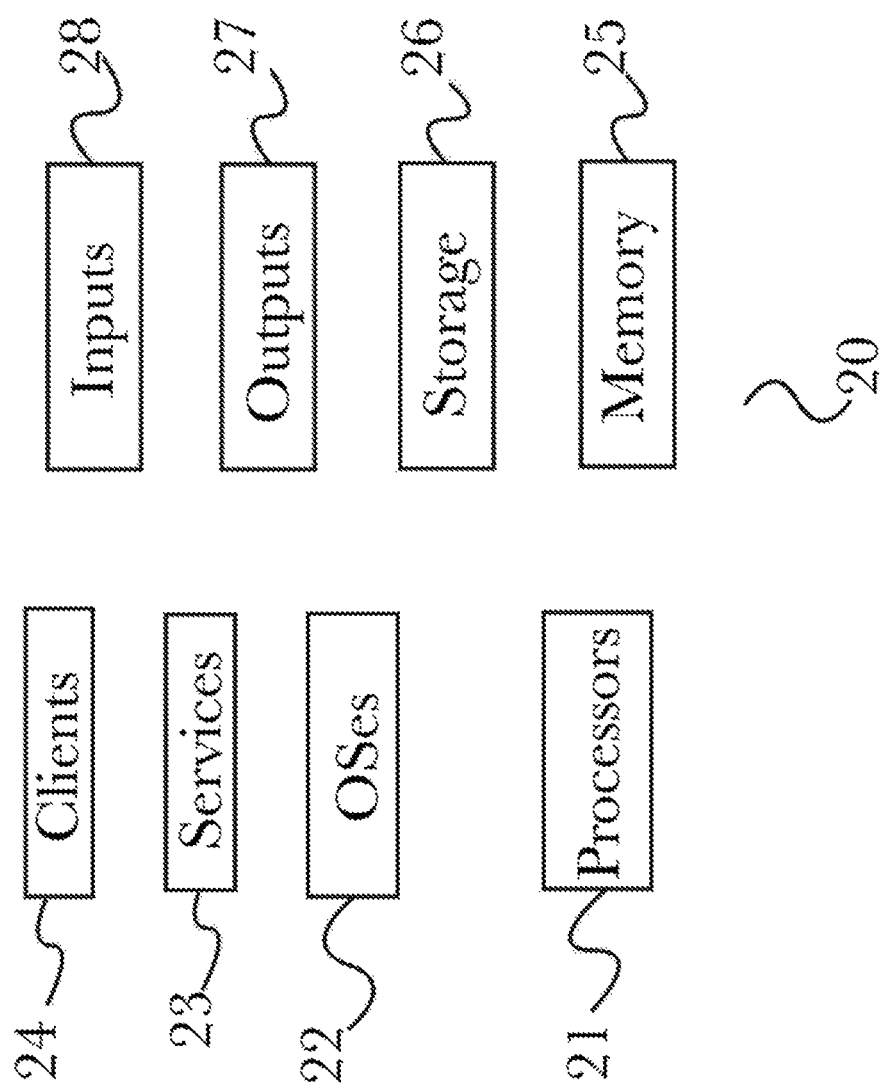
FIG. 10 is a block diagram illustrating an exemplary logical architecture for a client device.

In some aspects, systems according to the present aspect may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
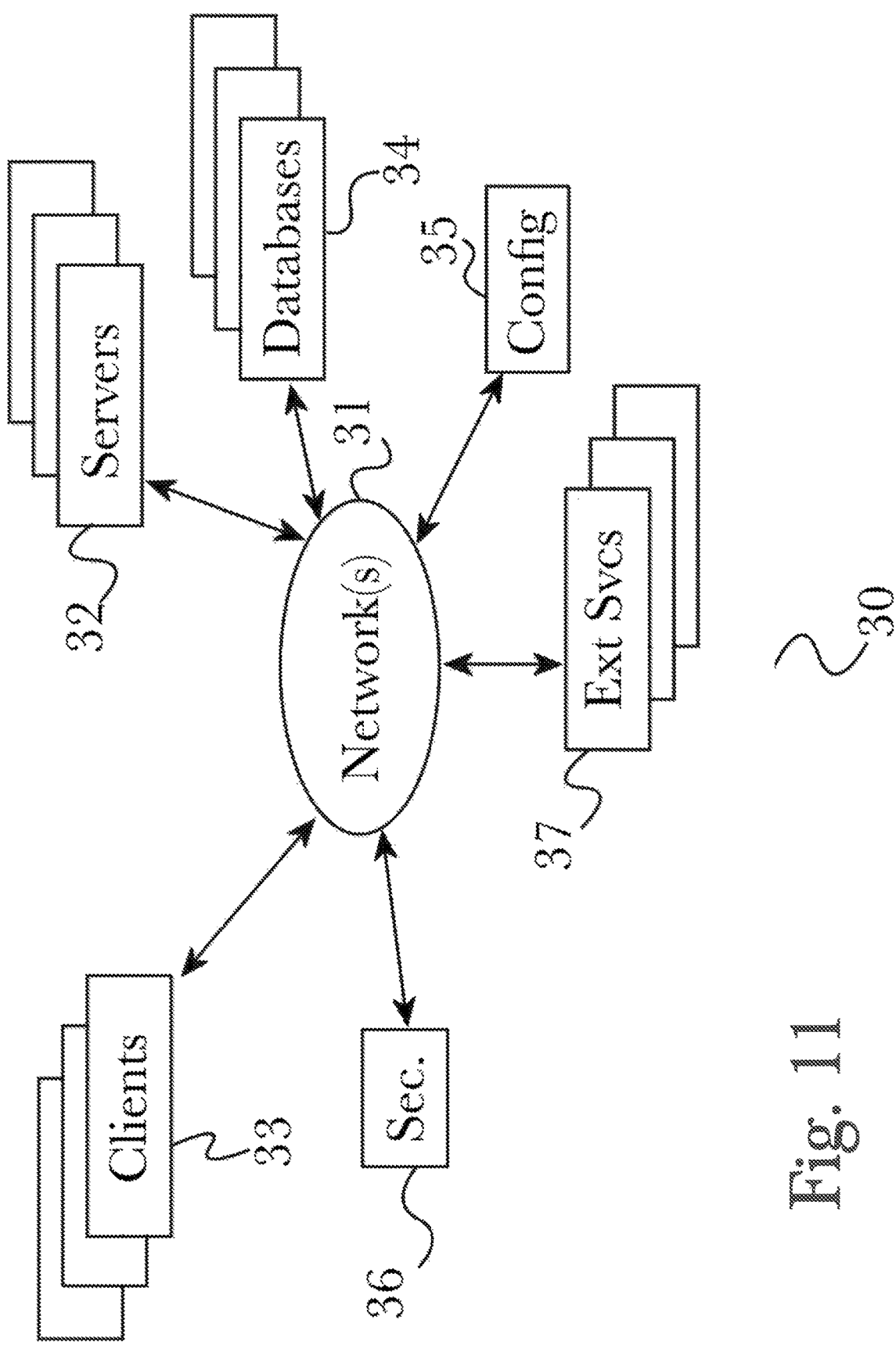
FIG. 11 is a block diagram showing an exemplary architectural arrangement of clients, servers, and external services.

In some aspects, systems of the present aspect may be implemented on a distributed computing network, such as one having any number of clients and/or servers. Referring now to FIG. 11, there is shown a block diagram depicting an exemplary architecture 30 for implementing at least a portion of a system according to an aspect on a distributed computing network. According to the aspect, any number of clients 33 may be provided. Each client 33 may run software for implementing client-side portions of the present aspect; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art. The aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in an aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
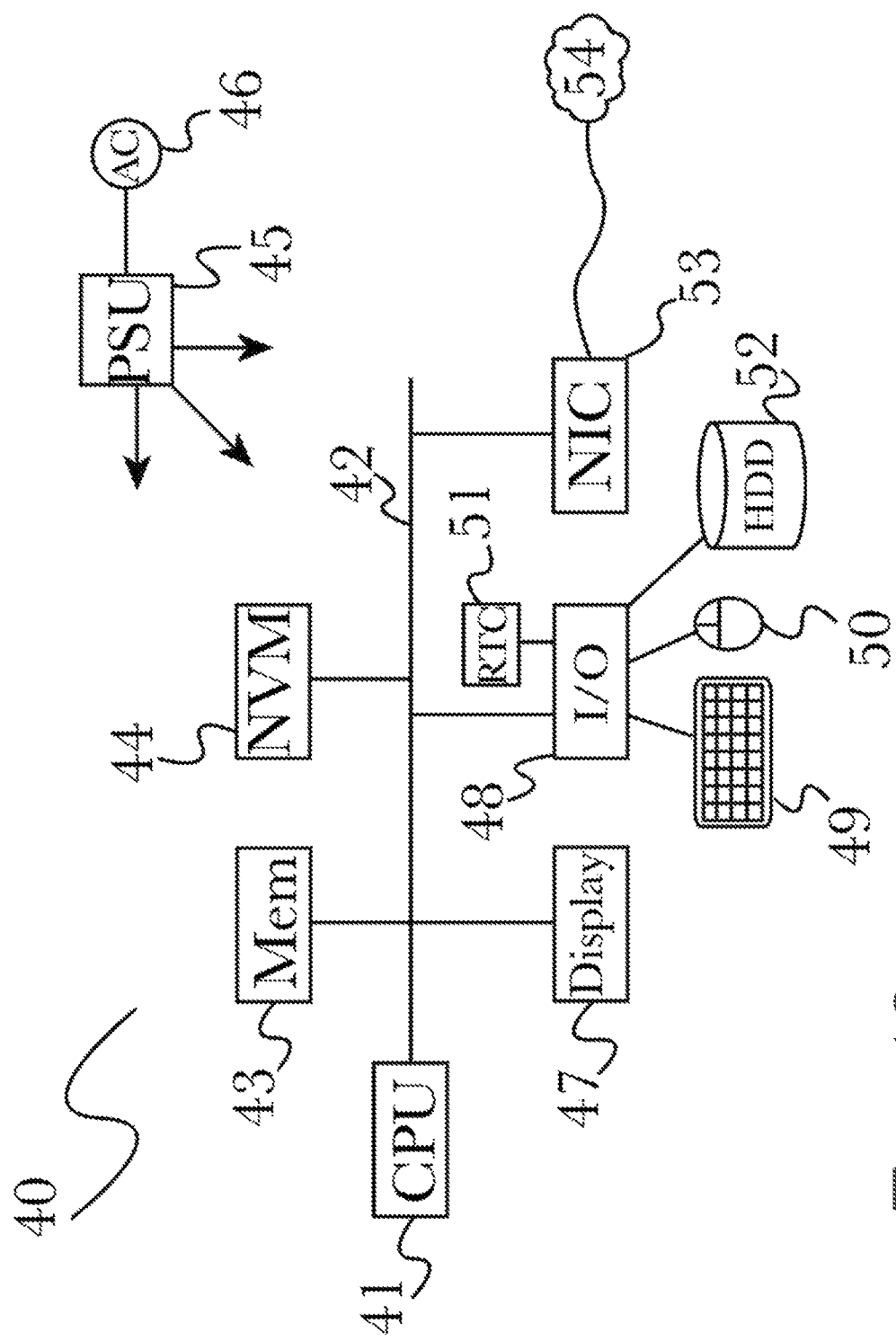
FIG. 12 is another block diagram illustrating an exemplary hardware architecture of a computing device.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. MC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of the various aspects described herein may be distributed among any number of client and/or server components. For example, various software modules may be implemented for performing various functions in connection with the aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for categorization and sentiment analysis, comprising:
   a chunk parser comprising at least a plurality of programming instructions stored in a memory and operating on at least one processor of a computer, wherein the programmable instructions, when operating on the at least one processor, cause the at least one processor to:
   receive input in text form;
   break the text into chunks of text to generate an embedded sequence vector in a semantic vector space from a sequence of words, wherein the chunks of text comprising words and phrases; and compute sentiment on the text at the chunk level, using a chunk parser; and a deterministic rules engine comprising at least a plurality of programming instructions stored in a memory and operating on at least one processor of a computer, wherein the programmable instructions, when operating on the processor, cause the processor to:

categorize the text into pre-defined categories using regular expression rules and store the categorization:

if no regular expression rule is matched, forward the chunked text to a semantic similarity engine: and a semantic similarity engine comprising at least a plurality of programming instructions stored in a memory and operating on at least one processor of a computer, wherein the programmable instructions, when operating on the at least one processor, cause the at least one processor to:

receive the chunked text;

represent each chunk of text as a vector embedded in a high dimensional space representing semantic characteristics of the chunked text;

categorize the chunked text into pre-defined categories using a threshold semantic similarity distance (hypersphere radius) from any of a set of pre-defined anchor word sequences for each category; and if no sufficiently close match is found to any pre-defined category anchor word sequences, forward the chunked text with embedded vector dimensions to a semantic cluster discovery engine; and a semantic cluster discovery' engine comprising at least a plurality of programming instructions stored in a memory' and operating on at least one processor of a computer, wherein the programmable instructions, when operating on the at least one processor, cause tire at least one processor to:

receive chunked text with embedded vector dimensions;

determine additional new categorizations for the chunked text by analyzing the text for contextual associations using a semantic clustering analysis and store the additional cluster categories and draw correlations between the categories and semantic vectors and generate metadata for the correlation; and a category and sentiment analysis engine comprising at least a plurality of programming instructions stored in a memory and operating on at least one processor of a computer, wherein the programmable instructions, when operating on the at least one processor, cause the at least one processor to:

receive the input text;

retrieve the categorizations of the chunked text including writer's attitude, emotion, ideological, quantitative analysis;

analyze the sentiment of categories of interest to a user of the system, wherein the analyzing includes determining user sentiment using the vectors, categories, and clusters; and output the results of the analysis to tire user in the form of text, graphics, or both, wherein the results are sorted by sentiment and showing trends over the time.

2. A method for categorization and sentiment analysis, comprising the steps of:

receiving input in text form;

breaking the text into chunks of text to generate an embedded sequence vector in a semantic vector space from a sequence of words, wherein the chunks of text comprising words and phrases, using a chunk parser;

computing sentiment on the text at the chunk level, using a chunk parser;

categorizing text into pre-defined categories using regular expression rules and storing the categorization, using a deterministic rules engine;

forwarding the chunked text to a semantic similarity engine if no regular expression rule is matched, using a deterministic rules engine;

representing each chunk of text as a vector embedded in a high dimensional space representing semantic characteristics of the chunked text, using a semantic similarity engine;

categorizing the chunked text into pre-defined categories using a threshold semantic similarity distance from any of a set of pre-defined anchor word sequences for each category, using a semantic similarity engine;

forwarding the chunked text with embedded vector dimensions to a semantic cluster discovery engine if no sufficiently close match is found to a pre-defined category anchor word sequence, using a semantic similarity engine;

determining additional, new categorizations for the chunked text by analyzing the text for contextual associations, using a semantic cluster discovers engine and draw correlations between the categories and semantic vectors and generate metadata for the correlation;

storing the additional cluster categories, using a semantic cluster discovery engine;

retrieving the categorizations of the chunked text, using a category and sentiment analysis engine, where sentiment analysis includes quantitative analysis of one or more of writer's attitude, emotion, or ideology;

analyzing the sentiment of categories of interest to a user of the system, using a category and sentiment analysis engine, wherein the analyzing includes determining user sentiment using the vectors, categories, and clusters; and outputting the results of the analysis to the user in the form of text, graphics, or both, using a category and sentiment analysis engine, wherein the results are sorted by sentiment and showing trends over the time.

* * * * *